UNITED STATES PATENT OFFICE.

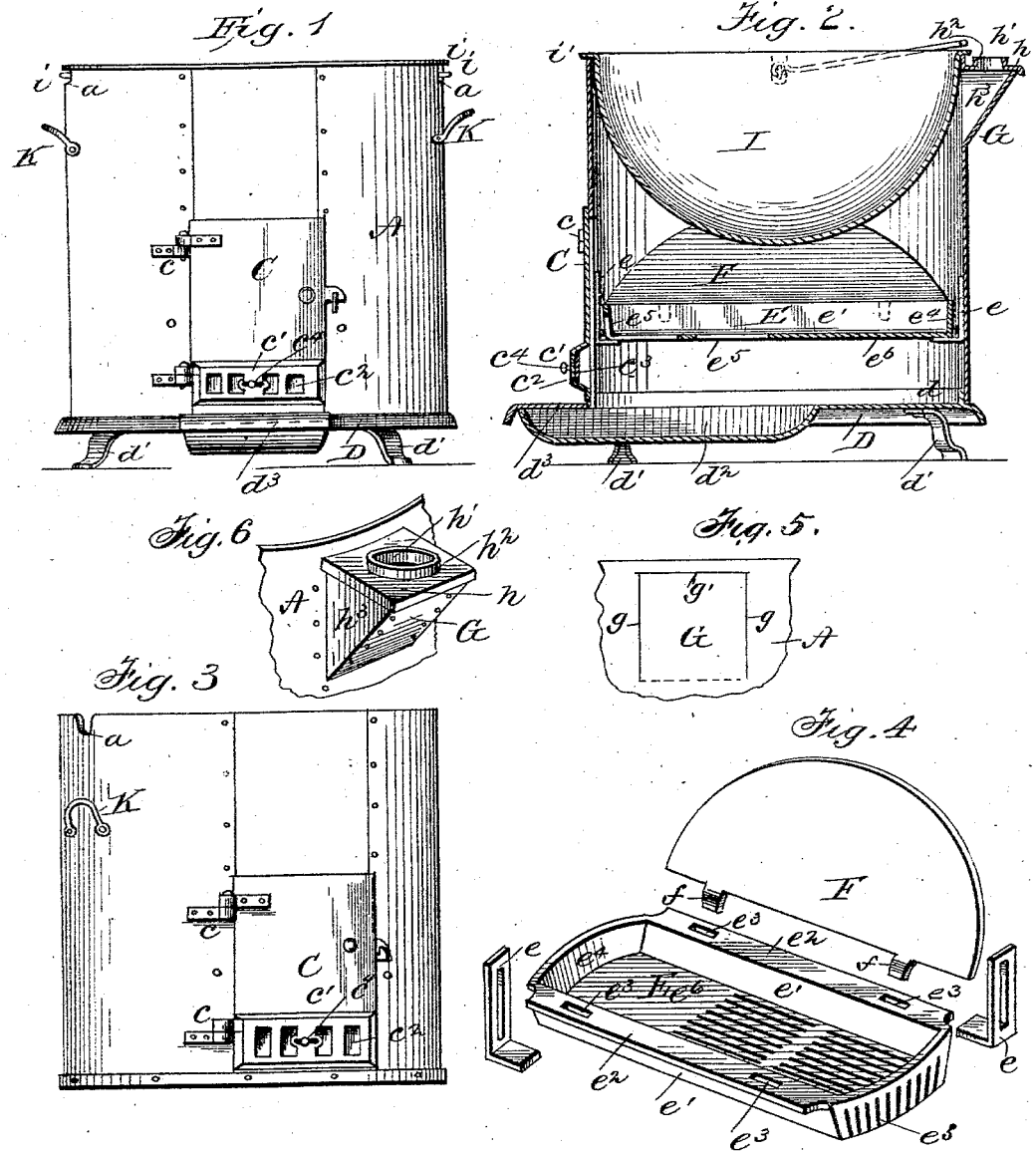

FREDERICK C. ZUMDAHL AND WILLIAM J. ZUMDAHL, OF FORRESTON, ILLINOIS.

AGRICULTURAL BOILER.

SPECIFICATION forming part of Letters Patent No. 571,634, dated November 17, 1896.

Application filed March 18, 1896. Serial No. 583,671. (No model.)

*To all whom it may concern:*

Be it known that we, FREDERICK C. ZUMDAHL and WILLIAM J. ZUMDAHL, citizens of the United States, residing at Forreston, in the county of Ogle, State of Illinois, have invented certain new and useful Improvements in Agricultural Boilers; and we do hereby declare the following to be a full, clear, and exact description of the invention, such as will enable others skilled in the art to which it appertains to make and use the same.

Our invention relates to improvements in that class of devices known as "agricultural boilers," and is particularly adapted for heating water, cooking food for stock, and like purposes.

The invention will first be described in connection with the accompanying drawings and then particularly pointed out in the claims.

In the drawings, Figure 1 is a side elevation of a device embodying our invention. Fig. 2 is a central vertical section of the same. Fig. 3 is a front elevation of a modification of our device. Fig. 4 is an enlarged detail perspective view of the grate, a pair of the slotted lugs, and one of the wings, the parts being separated. Fig. 5 is a detail view showing formation of the tongue G, and Fig. 6 is a detail view of stovepipe attachment.

Referring to the drawings, A is a cylindrical casing of heavy sheet metal having an opening in front, which is closed by a door C, hinged to the casing at $c$ and provided with an outward-extending lower portion $c'$, having draft-openings $c^2$, arranged to be closed by a slide or cut-off $c^3$ in a well-known manner, the slide being operated by means of a knob $c^4$.

The cylindrical casing is secured on the upward-projecting flange $d$ of a base D, provided with legs $d'$, which serve to hold the stove from the ground, and having a drop-pan $d^2$ projecting forward and covered by a sliding lid $d^3$. The base D, however, may be dispensed with and the casing placed directly upon the ground, in which case a strap or hoop may be riveted at the bottom of the sheet-iron casing in order to strengthen the same.

Inside the casing above the draft-openings $c^2$ are placed four slotted lugs $e$, bolted to the inside of said casing. On these four lugs is supported a pan E, having sides $e'$ and outward-flanged edges $e^2$, provided with holes $e^3$ on each side. The pan E also has a blank end $e^4$ and a grated end $e^5$, so that the pan is like a tray, the bottom being also grated, except at the rear end, where a blank portion $e^6$ is left. The corners of the flanged edges $e^2$ are cut away in order to leave room for the slotted portion of the lugs.

On top of the flanged edges $e^2$ are placed wings F, having pintles $f$, which enter the holes $e^3$ in the grate E, the wings resting with their top ends against the inner sides of the casing A, being suitably shaped for that purpose. These wings, in connection with the grate, form the partition between the combustion-chamber and the ash-pit.

The pan or grate E and wings F may be adjusted up and down by means of the slotted lugs $e$, which may be lowered to support the said grate and wings below the draft-openings. When the grate is in its upper position, it may be used for coal and when in its lowered position for wood.

At the back of the cylindrical casing is a shoulder or joint for the attachment of a common stovepipe. This shoulder is preferably made as follows: Two slits $g$, the width of the shoulder apart, are cut in the sheet metal of the casing, these slits being connected by a transverse slit $g'$ at one end, whereby a tongue G is formed, which may be bent outward or rearward from the casing and at an incline. Another strip of sheet metal is then cut to form a central rectangular portion $h$, having a stovepipe-hole $h'$, around the margin of which the sheet-iron is flanged upward, as at $h^2$, to enter the base of the stovepipe in a well-known manner.

At each side of the rectangular portion $h$ are triangular wings $h^3$, which fill the openings between the inclined tongue G and the casing and form sides for the shoulder or smoke-box, these triangular pieces $h^3$, as well as the central portion $h$, being flanged and riveted to the tongue and to the casing, as shown.

Instead of making the central portion $h$ and the triangular wings $h^3$ of sheet-iron they may be cast integral in the desired shape and provided with cast flanges, by means of which they are riveted in place, as previously described.

The top edge of the casing has two slots $a$ opposite each other, into which slots enter the ears $i$ of an ordinary cast-iron kettle I, having a rim $i'$ resting on the upper edge of the casing, whereby the kettle is held in the upper portion of the casing A over the grate.

The casing is provided with handles K, one at each side, as an aid to handling or transporting the device.

Having thus fully described our invention, what we claim as new, and desire to secure by Letters Patent, is—

1. In an agricultural boiler, the combination, with a sheet-iron casing having a door provided with a draft-opening, of a set of slotted lugs adjustably secured to the inside of said casing, a grate resting on the lugs and a pair of wings contacting with said grate and with the sides of the said casing, substantially as described.

2. In an agricultural boiler, the combination, with a sheet-iron casing, of a tongue cut from said casing and extending rearward at an incline, and a strip having a central portion provided with a smoke-opening, and a pair of triangular wings forming sides, said strip being flanged and secured to the tongue and to the casing, whereby a smoke-box is formed, substantially as described.

3. In an agricultural boiler, the combination, with a cylindrical casing having lugs projecting inward, of a tray having a grated bottom and flanges at its sides provided with holes, said tray resting on lugs, and a pair of wings provided with studs which are arranged to enter the holes in the flanges of the grate-tray, the upper ends of said wings resting against the inside of the casing, substantially as described.

4. In an agricultural boiler, the combination, with a casing having a door provided with a draft-opening, of a series of slotted lugs adjustably secured to the inside of the casing, a pan having flanged edges resting on said lugs and provided with holes, said pan being grated at its front end and having a grated bottom at its forward end, and a pair of wings provided with lugs entering the holes in the flanged edges, said wings resting loosely against the inside of the casing, whereby the pan may be adjusted above or below the draft-opening, substantially as described.

In testimony whereof we affix our signatures in presence of two witnesses.

FREDERICK C. ZUMDAHL.
WILLIAM J. ZUMDAHL.

Witnesses:
FRED J. DENTH,
GEO. REBMAN.